(12) United States Patent
Sadakata et al.

(10) Patent No.: US 7,455,819 B2
(45) Date of Patent: Nov. 25, 2008

(54) APPARATUS FOR SIMULTANEOUS DRY DESULFURIZATION/DENITRIFICATION

(75) Inventors: Masayoshi Sadakata, Tokyo (JP); Mitsuo Koshi, Tokyo (JP); Masateru Nishioka, Miyagi (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 410 days.

(21) Appl. No.: 10/547,085

(22) PCT Filed: Dec. 26, 2003

(86) PCT No.: PCT/JP03/17025

§ 371 (c)(1), (2), (4) Date: Aug. 26, 2005

(87) PCT Pub. No.: WO2004/076032

PCT Pub. Date: Sep. 10, 2004

(65) Prior Publication Data

US 2006/0147356 A1 Jul. 6, 2006

(30) Foreign Application Priority Data

Feb. 28, 2003 (JP) .............................. 2003-054900

(51) Int. Cl.
*B01D 53/60* (2006.01)
(52) U.S. Cl. .................... 423/235; 423/242.1; 423/393; 423/400; 423/522; 423/532
(58) Field of Classification Search .................. 423/235, 423/242.1, 393, 400, 522, 532, 555; 422/168
See application file for complete search history.

(56) References Cited

U.S. PATENT DOCUMENTS 5,670,122 A * 9/1997 Zamansky et al. .......... 422/168

2003/0180196 A1 * 9/2003 Gillespie et al. ............ 422/168

FOREIGN PATENT DOCUMENTS

| JP | 5-228330 | 9/1993 |
|----|----------|--------|
| JP | 7-323212 | 12/1995 |
| JP | 8-243340 | 9/1996 |
| JP | 10-202049 | 8/1998 |
| JP | 10-225613 | 8/1998 |
| JP | 11-82977 | 3/1999 |
| JP | 2001-11041 | 1/2001 |
| JP | 2001-120943 | 5/2001 |
| JP | 2002-361034 | 12/2002 |
| WO | WO 98/35909 | 8/1998 |

OTHER PUBLICATIONS

H. Sakamoto et al.; "Chemical Kinetics of Homogenous Oxidation of $SO_2$ in Flue Gases", Crest Int'l. Symposiu on Advanced Desox Process, Project Rpt., Dec. 7, 2002., Dpt. of Chemical Systm Eng., Univ. of Tokyo, pp. 169-180.

M. A. Mueller et al.; "Kinetic Modeling of the $CO/H_2O/O_2/NO/SO_2$ System: Implications for High-Pressure Fall-off in the $SO_2 + O$ (+ M) = $SO_3$(+ M) Reaction". Dpt. of Mechanical and Aerospace Engineering, Princeton Univ., 2002, pp. 317-339.

* cited by examiner

*Primary Examiner*—Timothy C Vanoy
(74) *Attorney, Agent, or Firm*—Westerman, Hattori, Daniels & Adrian, LLP.

(57) ABSTRACT

It is an high efficiency and low cost apparatus for simultaneous dry desulfurization and denitration (10), capable of simultaneous oxidation of nitrogen monoxide and sulfur dioxide by chain reaction with OH radical, provided with an OH radical supplying unit (12), a reactor (14), a sulfuric acid recovering unit (16), and a nitric acid recovering unit (18). Exhaust gas at 600-800° C. containing sulfur compounds from a boiler (2) is introduced into the reactor (14), nitric acid is spray-supplied from an OH radical supplying unit (12) into the reactor (14), sulfur dioxide and nitrogen monoxide are simultaneously oxidized with OH radicals generated from pyrolysis of nitric acid as an initiator to form sulfur trioxide and nitrogen dioxide, thereby exhaust gas is treated.

6 Claims, 16 Drawing Sheets

FIG. 2

| Reaction | $k=AT^n\exp(-E_a/RT)$ (cm,mol,s,cal unit) | | |
|---|---|---|---|
| | A | n | Ea |
| $OH+HNO_3=H_2O+NO_3$ | $1.03 \times 10^{10}$ | 0.0 | −1240 |
| $O+HNO_3=OH+NO_3$ * | — | — | — |
| $H+HNO_3=H_2O+NO_2$ | $6.08 \times 10^1$ | 3.29 | 6286 |
| $H+HNO_3=H_2+NO_3$ | $5.56 \times 10^8$ | 1.53 | 16400 |
| $H+HNO_3=OH+HONO$ | $3.82 \times 10^5$ | 2.30 | 6977 |
| $NO_3+OH=HO_2+NO_2$ | $1.40 \times 10^{13}$ | 0.0 | 0 |
| $NO_3+O=NO_2+O_2$ | $1.02 \times 10^{13}$ | 0.0 | 0 |
| $NO_3+H=OH+NO_2$ | $6.61 \times 10^{13}$ | 0.0 | 0 |

* : $k < 1.8 \times 10^7$ at 300K and not included in the calculation (a)

(b)

APPARATUS FOR SIMULTANEOUS DRY DESULFURIZATION/DENITRIFICATION

TECHNICAL FIELD

The present invention relates to the apparatus for simultaneous dry desulfurization and denitration to induce chain reaction using OH radicals, thereby to simultaneously oxidize nitrogen monoxide and sulfur dioxide, which is utilized for removal of such atmospheric contaminants as nitrogen and sulfur compounds contained in exhaust gas.

BACKGROUND ART

Fossil fuels such as coal contains sulfur compounds as impurities, and most of sulfur content is exhausted as sulfur dioxide upon combustion under excess of oxygen. Sulfur dioxide contained in exhaust gas is generally removed by wet process using a scrubber to contact exhaust gas with the mist of absorbent and absorb and remove sulfur dioxide (Refer, for example, to the Japanese laid open Patent Application (JP H10-202049-A)).

A dry exhaust gas treating method is also known which oxidizes sulfur dioxide gas by passing sulfur dioxide in exhaust gas through pulsed corona discharge region, and removes it by adsorbing on fine powder of calcium oxide or others as an adsorbent (Refer, for example, to the Japanese laid open Patent Application (JP H05-228330-A)). Further, the art to convert sulfur dioxide gas to sulfur trioxide gas with vanadium pentoxide ($V_2O_5$) as an oxidizing catalyst was disclosed in the Japanese laid open Patent Application (JP 2001-11041-A).

However, by the exhaust gas treating method of wet process, big plant investment is required, and an apparatus itself is large-sized due to required large amount of water, and therefore, it is not easily utilized where water resource is scant. Also by the exhaust gas treating method of dry process, high cost is required due to the use of additives and oxidative catalysts.

DISCLOSURE OF THE INVENTION

The object of the present invention is to solve such problems, and to offer an apparatus for simultaneous dry desulfurization and denitration of high efficiency and low cost, capable of treating exhaust gas by dry process without catalysts or others, and of simultaneous oxidation of nitrogen monoxide and sulfur dioxide by chain reaction using OH radicals.

In order to achieve the above-mentioned object, an apparatus for simultaneous dry desulfurization and denitration of the present invention is characterized in that, in a dry exhaust gas treating apparatus to treat exhaust gas of high temperature, it is comprised of a reactor and an OH radical supplier, and treats exhaust gas by supplying either OH radicals or OH radical initiators to the reactor into which exhaust gas is introduced, and by oxidizing either sulfur or nitrogen compounds in exhaust gas, or both of them simultaneously.

In addition to the above-mentioned makeup, the reactor may be provided with an inner and an outer tubes coaxially spaced, and a radical supplying inlet to supply either OH radicals or OH radical initiators to an inner tube. In the inner tube, there may be radical supplying inlets provided in plurality at the pre-designed interval, capable of multi-step blow-in. The reactor is preferably provided with injectors to supply OH radicals and OH radical initiators. It is advantageous if said injectors are provided in plurality with different lengths capable of multi-step blow-in. The reactor may also be provided with either a shower pipe or a spray nozzle, or both, to supply either OH radicals or OH radical initiators. Said reactor may be either horizontal or vertical type. The OH radical supplier may preferably have a radical generation source and a gas supplying system. The OH radical initiator is preferably nitric acid. OH radicals are generated by pyrolysis of nitric acid.

According to said aspect, the sulfur compound in exhaust gas is sulfur dioxide, the nitrogen compound is nitrogen monoxide, and sulfur dioxide and nitrogen monoxide can be simultaneously oxidized with either OH radicals or OH radicals generated from OH radical initiators as the initiator. In this case, the oxides generated from simultaneous oxidation are sulfur trioxide and nitrogen dioxide.

The apparatus for simultaneous dry desulfurization and denitration of such aspect induces chain reaction with supplied OH radicals as the initiator, simultaneously oxidizes sulfur dioxide and nitrogen monoxide to sulfur trioxide and nitrogen dioxide, and exhausts them. Therefore, the apparatus for simultaneous dry desulfurization and denitration of the present invention is capable of exhaust gas treating in dry process without using catalysts and others at high efficiency and low cost.

Further, the apparatus for simultaneous dry desulfurization and denitration of the above-mentioned aspect is preferably provided with a sulfuric acid recovery apparatus to recover sulfur trioxide formed by oxidation process of exhaust gas as either sulfuric acid or gypsum, or both. Also, the above-mentioned apparatus for simultaneous dry desulfurization and denitration is preferably provided with a nitric acid recovery apparatus to recover nitrogen dioxide formed by oxidation process of exhaust gas as nitric acid. It may also be provided with a nitric acid recovery apparatus to recover OH radical suppliers as nitric acid. The recovered nitric acid may be reused by recycling as OH radical suppliers.

Since the apparatus for simultaneous dry desulfurization and denitration of such aspect recovers sulfuric acid from sulfur trioxide formed by oxidative treating of exhaust gas, sulfuric acid or gypsum can be recovered efficiently. Nitrogen dioxide formed by oxidative treating of exhaust gas can also be recovered as nitric acid, and further, in case that nitric acid is supplied as an OH radical supplier, nitric acid can be recovered and recycled, thereby reused as an OH radical supplier.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to specify or to limit the present invention but to facilitate an explanation and an understanding thereof. In the drawings.

FIG. 2 is a table showing the rate constants of added elementary reactions;

BEST MODES FOR CARRYING OUT THE INVENTION

Figure 1:
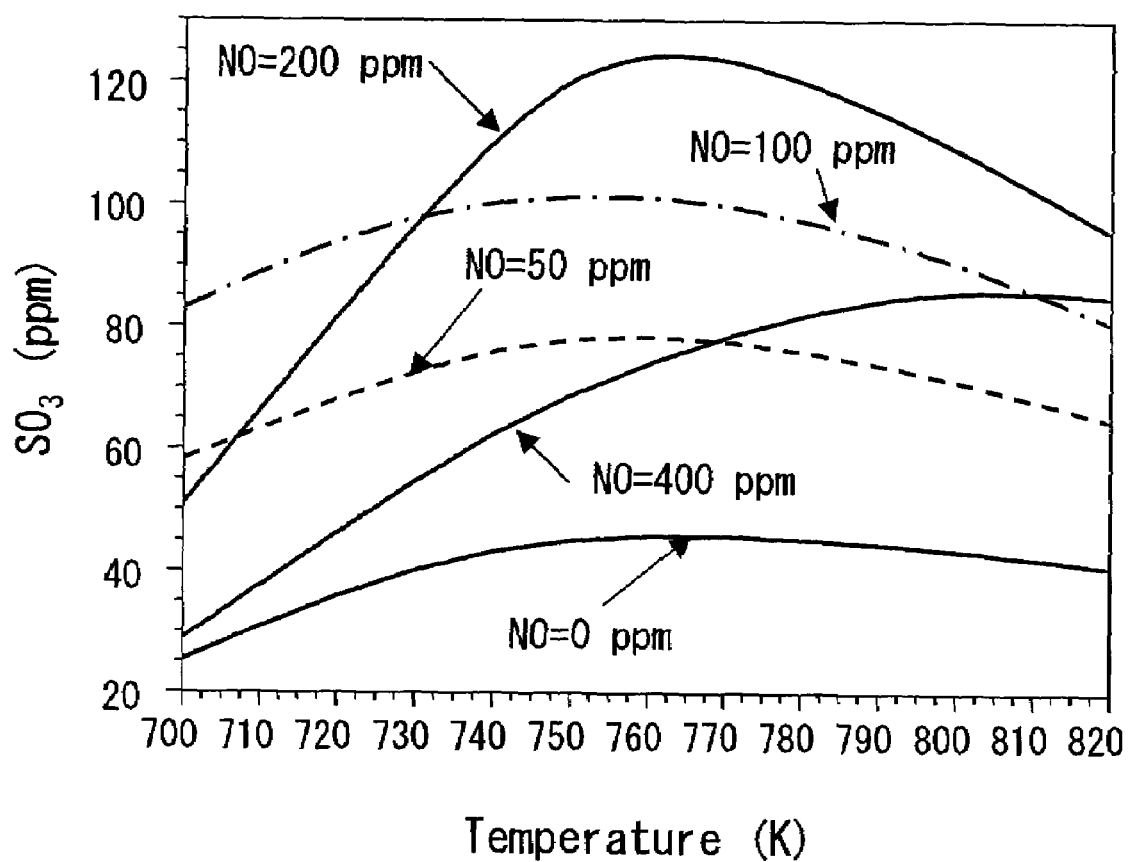
FIG. 1 is a graph showing the calculation result of temperature dependency of $SO_3$ generation concentration on the added amount of NO with $HNO_3$ kept constant.

Hereinafter, the suitable embodiments in accordance with the present invention will be described in detail with reference to FIGS. 1-16, using the same symbol for practically identical or corresponding parts.

First, the dry process of simultaneous desulfurization and denitration is explained as the principle of an apparatus for simultaneous dry desulfurization and denitration of the present invention. As the result of the present inventors' research on the desulfurization and denitration method capable of easily oxidizing $SO_2$ and NO without catalyst, efficient chemical reactions were discovered for the first time by various studies and calculations to oxidize sulfur dioxide ($SO_2$) and nitrogen monoxide (NO) contained in exhaust gas from various combustion ovens by gas phase chain reaction to sulfur trioxide ($SO_3$) and nitrogen dioxide ($NO_2$), using OH or OH radicals (Mitsuo Koshi, et al, "Chemical Kinetics of Homogeneous Oxidation of $SO_2$ in Flue Gases", CREST International Symposium on ADVANCED DESOx PROCESS, Japan Science and Technology Corporation, Dec. 6, 2002, pp. 169-180).

The oxidation of $SO_2$ and NO in exhaust gas from various combustion ovens, that is, the desulfurization and denitration method used for the present invention is so made up that chain reactions proceed as the chemical equations shown below.

$OH+SO_2+M=HOSO_2+M$ (R1),

$HOSO_2+O_2=HO_2+SO_3$ (R2),

$HO_2+NO=OH+NO_2$ (R3), and

$HNO_3+M=OH+NO_2+M$ (R4).

$SO_2$ and NO in exhaust gas are at left-hand sides of the chemical reaction equations (R1) and (R3). Here, $O_2$ is oxygen gas contained in exhaust gas. M is the gas not involved in reactions, for example, $N_2$, and $CO_2$ and $H_2$ or the like added together with $N_2$.

The above-mentioned chemical reaction are explained here. As shown in chemical reaction equation (R4), OH is formed from $HNO_3$. OH is the high temperature radical state in exhaust gas. If OH is supplied to chemical reaction in equation (R1), OH, $SO_2$, and M react to form $HOSO_2+M$.

$HOSO_2$ formed here reacts with $O_2$ in exhaust gas to form $HO_2$ and $SO_3$ (Refer to chemical reaction equation (R2)). In this case, since $O_2$ concentration in exhaust gas is much higher than any other radical species, the reaction rate of (R2) is higher than the reactions of other $HOSO_2$ with radical species, like $OH+HOSO_2$, $O+HOSO_2$, or $H+HOSO_2$.

Next, $HO_2$ formed by chemical reaction equation (R2) reacts with NO to form HO and $NO_2$ (Refer to chemical reaction equation (R3)). Thus, with added OH, chain reactions are established.

From these, the sum up of chemical reaction equations (R1)-(R3) becomes to be,

$SO_2+NO+O_2=SO_3+NO_2$. (R5)

It is thus seen that $SO_2$, NO, and $O_2$ in exhaust gas react and they are oxidized to $SO_3$ and $NO_2$.

Thereby, $SO_2$ and NO in exhaust gas containing $O_2$ can be oxidized, as shown in chemical reaction equation (R4), to $SO_3$ and $NO_2$ by chain reaction with OH or OH radicals formed from $HNO_3$ pyrolysis. Consequently, since the vapor pressure and pyrolysis rate of $HNO_3$ are higher than those of $H_2O_2$, and its handling is also easier than $H_2O_2$, $SO_2$ and NO in exhaust gas containing $O_2$ can be oxidized with low cost.

The simulation result of $SO_2$ and NO oxidation by the above-mentioned chemical reaction equations is explained next. Said simulation was conducted by calculating the above-mentioned chemical reaction equations (R1)-(R4) by reaction mechanism of $SO_x$ proposed by Mueller et al, and by adding some more elementary reactions involving $HNO_3$ and $NO_3$ (Refer to M. A. Mueller, R. A. Yetter, and F. L. Dryer, Int. J. Chem. Kinet., 32, 317 (2000)).

First, the dependency of added NO quantity upon $HNO_3$ addition to $SO_2$ in exhaust gas is explained. FIG. 1 is a graph showing the calculation result of temperature dependency of $SO_3$ generation concentration on the added amount of NO with $HNO_3$ kept constant. In the figure, the abscissa is temperature (K), and the ordinate is $SO_3$ concentration (ppm).

The calculation condition here is the hypothesis that the reaction proceeds in adiabatic state, and that the reaction time is one second. In this case, $SO_2$ concentration in exhaust gas is 2000 ppm, and $HNO_3$ concentration is 1000 ppm. M consists of $N_2$, $CO_2$, and $H_2O$, and the total pressure including $O_2$ in exhaust gas is 1 atm, since those of $SO_2$ and $HNO_3$ are negligible because their concentrations are trivial, and their ratio (%) is

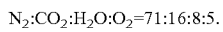

$N_2:CO_2:H_2O:O_2=71:16:8:5$.

FIG. 2 is a table showing the rate constants of added elementary reactions. Added elementary reactions are, for example, the chemical reaction equations shown below inhibiting chemical reaction equation (R4).

$OH+HNO_3=H_2O+NO_3$ (R6), and

$OH+NO_3=NO_2+HO_2$ (R7).

In FIG. 1, it is seen that the reaction from $SO_2$ to $SO_3$ proceeds at NO=0 ppm, but its rate remarkably increases by NO addition. In case that NO concentration is 50 ppm, the conversion from $SO_2$ to $SO_3$ (hereinafter called as $SO_3$ conversion) is maximum around T=750 K, that is, about 4%. In case of NO concentration 200 ppm, $SO_3$ conversion is maximum between T=750-770K, that is, about 6.3%. Further in case that NO concentration is increased to 400 ppm, $SO_3$ conversion is lowered than at 200 ppm, and it gradually increases from 1.5% to 4.3% at T=700-820K. It is seen from these observations that $SO_3$ conversion is improved by NO addition together with $SO_2$ into exhaust gas, and that optimum NO concentration exists for it.

In FIG. 1, the reason for maximum conversion to $SO_3$ at around 750K except for 400 ppm of $HNO_3$ concentration is explained.

Figure 3:
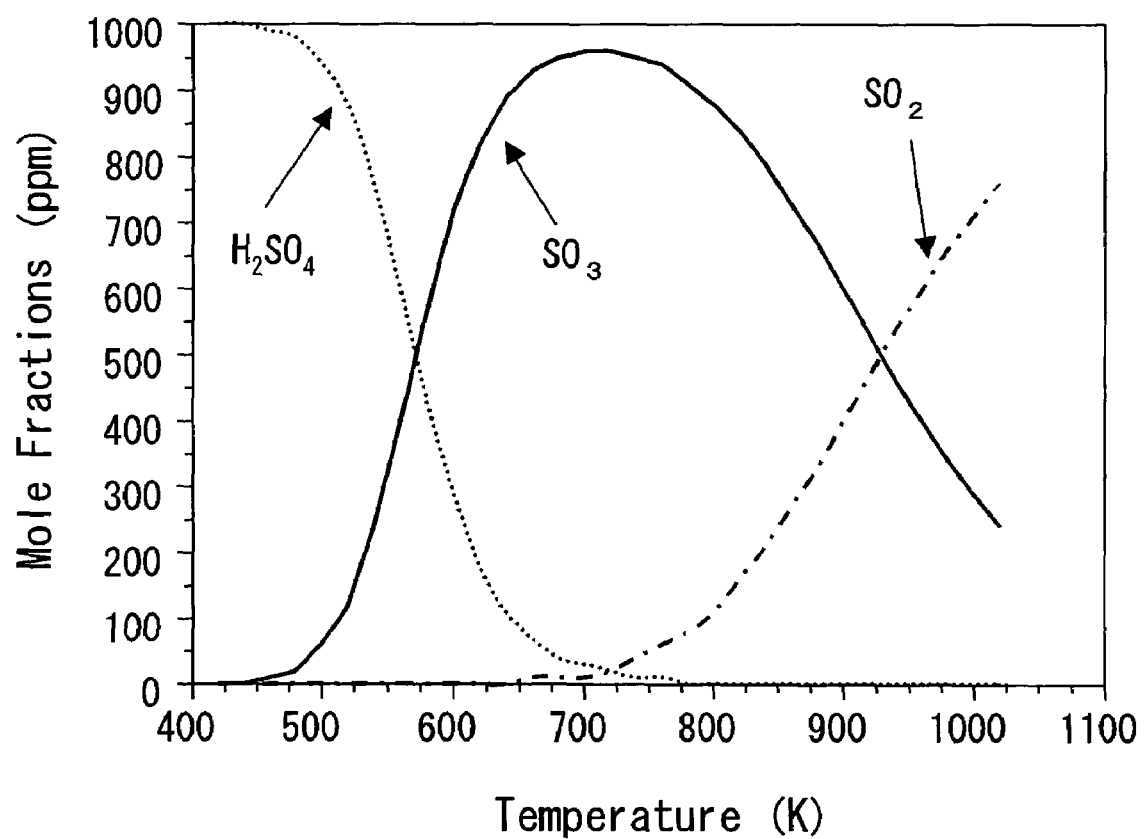
FIG. 3 is a graph showing the calculated values of mole fraction of sulfur compounds between 400 and 1000K.

FIG. 3 is a graph showing the calculated values of mole fraction of sulfur compounds between 400 and 1000K. Its ordinate is mole fraction of sulfur compounds, and abscissa is temperature (K). It is seen from this that $SO_3$ is more stable than $H_2SO_4$ and $SO_2$ at 600-850K, and especially, its mole fraction reaches the maximum value at 650-800K. Therefore, it is conceivable that $SO_2$ is easily oxidized at 650-800K.

Figure 4:
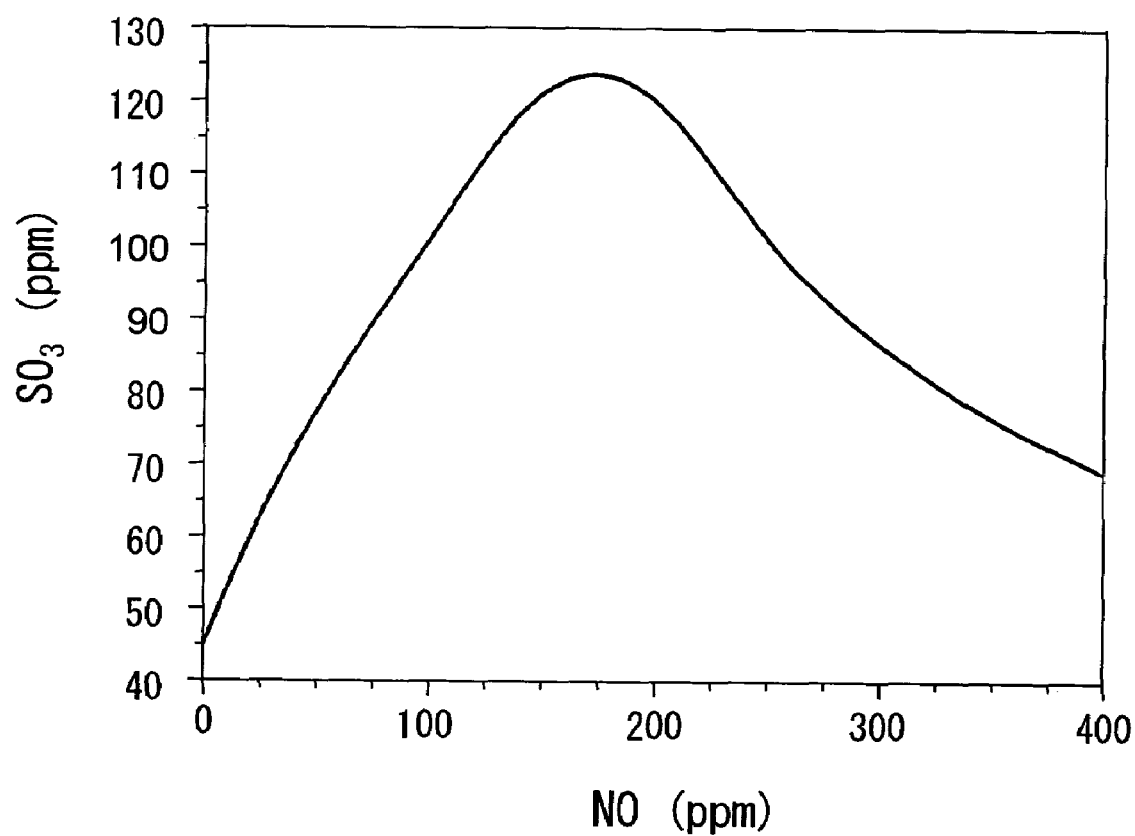
FIG. 4 is a graph showing the calculation result of $SO_3$ generation dependency on NO addition concentration at T=750K.

FIG. 4 is a graph showing the calculation result of $SO_3$ generation dependency on NO addition concentration at T=750K. In the figure, its ordinate is $SO_3$ concentration, and abscissa is NO concentration (ppm). The condition is same as in FIG. 1 except that $HNO_3$ concentration is 100 ppm. It is seen that $SO_3$ conversion increases till NO concentration of about 200 ppm, and decreases with NO concentration above that.

Figure 5:
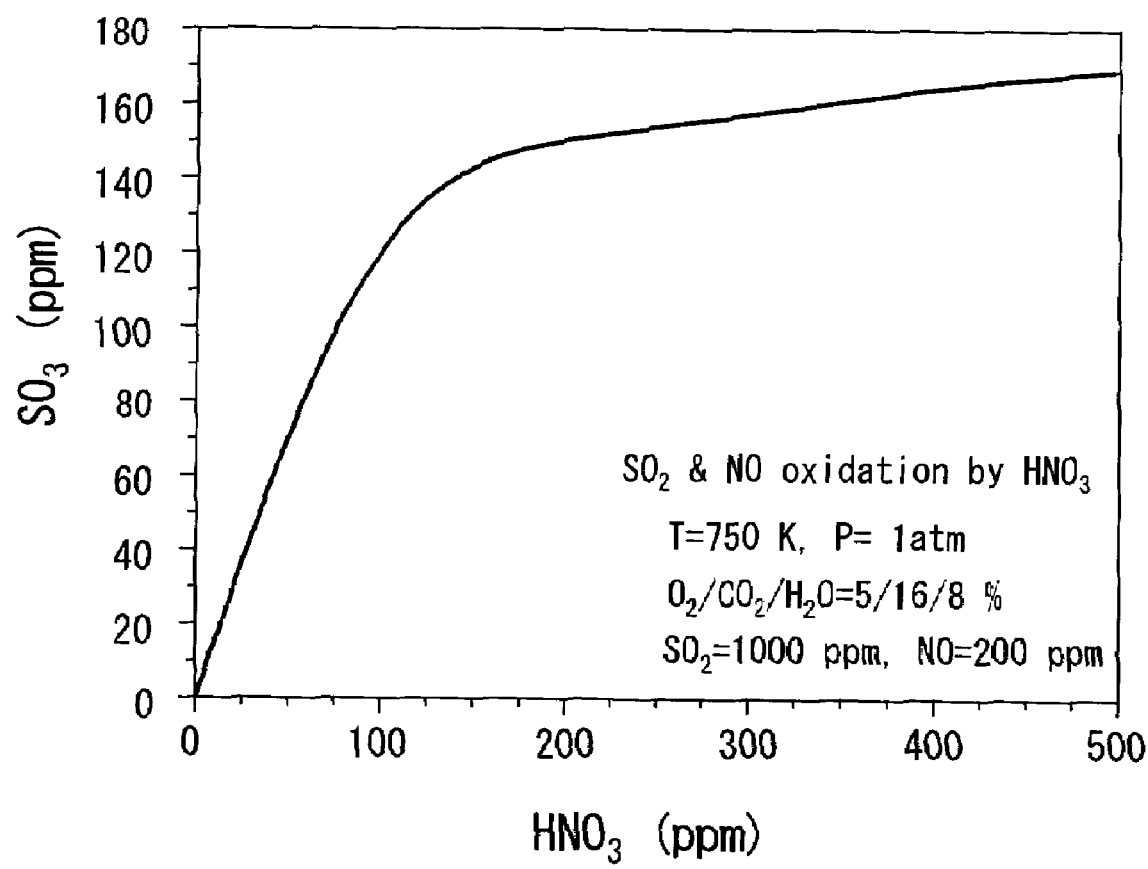
FIG. 5 is a graph showing the calculation result of $SO_3$ generation rate dependency on $HNO_3$ addition concentration at T=750K.

$SO_3$ conversion dependency on $HNO_3$ concentration with addition of NO 200 ppm into exhaust gas is shown next. FIG. 5 is a graph showing the calculation result of $SO_3$ generation rate dependency on $HNO_3$ addition concentration at T=750K. In the figure, its ordinate is $SO_3$ concentration, and abscissa is $HNO_3$ concentration (ppm). The condition is same as in FIG. 1 except that $SO_2$ concentration is 1000 ppm, and NO concentration is 200 ppm. It is seen that $SO_3$ conversion is about 15, 16, and 17%, respectively, with $HNO_3$ concentration 200, 300, and 400 ppm. $SO_3$ generation increases with the increase of $HNO_3$ concentration till $HNO_3$ concentration of about 100 ppm. In case that $HNO_3$ concentration is higher than about 200 ppm, $SO_3$ conversion tends to saturate with respect to $HNO_3$ concentration. Said conversion is seen to increase remarkably in comparison with the case of no NO addition shown in FIG. 1. In this case, NO conversion to $NO_2$ (hereinafter, to be called $NO_2$ conversion) is 80 to 90%.

Figure 6:
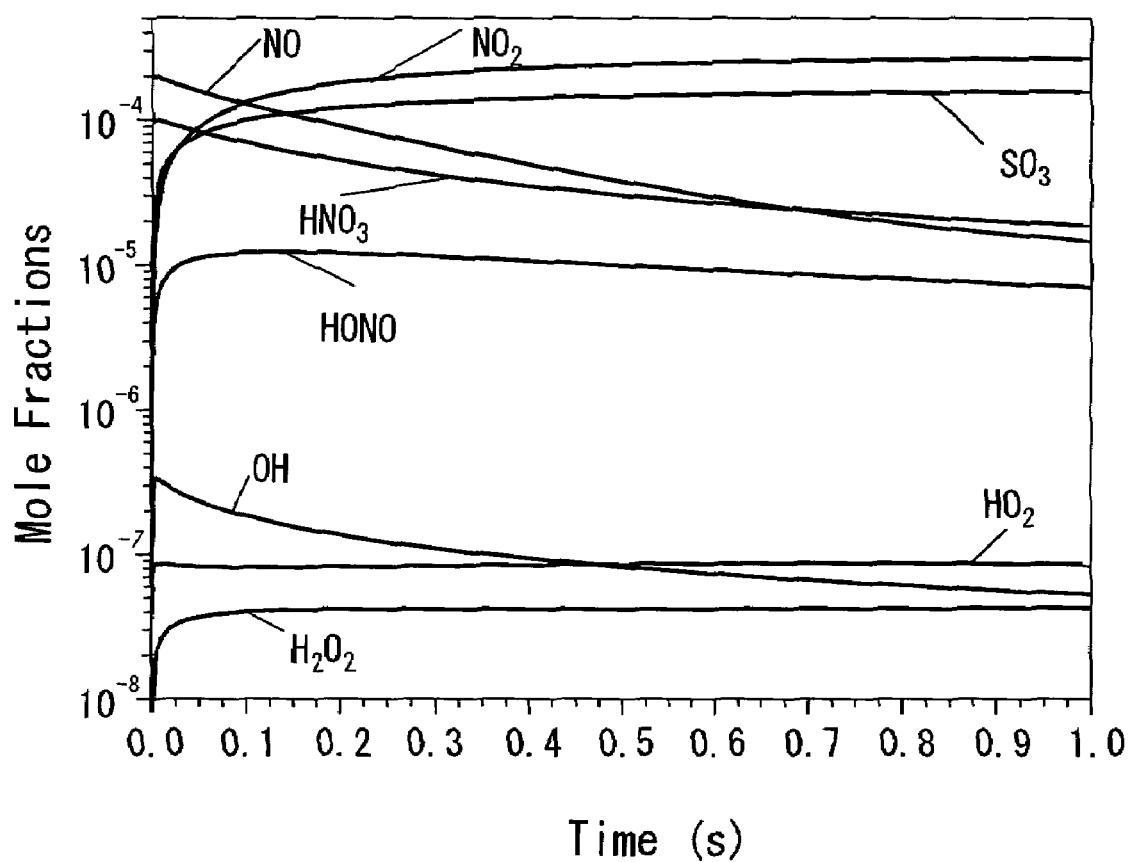
FIG. 6 is a graph showing the calculation result of the change with time of various chemical species in oxidation reaction of $SO_2$ and NO of FIG. 4.

FIG. 6 is a graph showing the calculation result of the change with time of various chemical species in oxidation reaction of $SO_2$ and NO of FIG. 5. In the figure, its ordinate is mole fraction, and abscissa is time (second). The condition is same as in FIG. 1 except that temperature is 750K, NO concentration is 200 ppm, and $SO_2$ concentration is 1000 ppm. It is seen from the figure that $SO_2$ and NO are oxidized by $HNO_3$ pyrolysis to form about 0.2 second. It is also seen from this that main oxidation products are $SO_3$ and $NO_2$, and NO is scarcely formed, and added NO is almost completely oxidized to $NO_2$.

Figure 7:
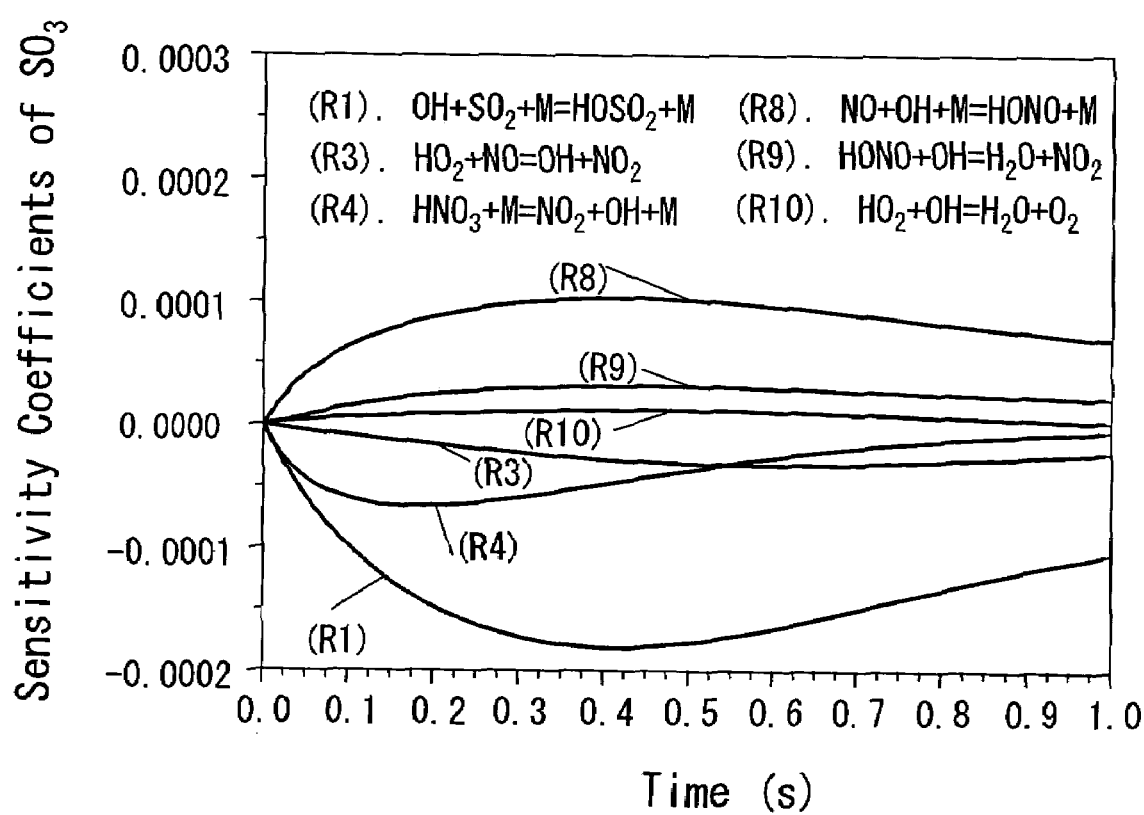
FIG. 7 is a graph showing the calculation result of sensitivity coefficients of major elementary reactions to $SO_3$ concentration under the calculation conditions of FIG. 6.

FIG. 7 is a graph showing the calculation result of sensitivity coefficients of major elementary reactions to $SO_3$ concentration under the calculation conditions of FIG. 6. The initial conditions are same as in FIG. 6. In the figure, its ordinate is the sensitivity coefficients of major elementary reactions to generate $SO_3$, and abscissa is time (second). The sensitivity coefficient $S_{ij}$ of an elementary reaction i for a chemical species j is given as $S_{ij}=\partial C_j/\partial k_i$, where $C_j$ is the concentration of a chemical species j, and $k_i$ is a rate constant of an elementary reaction i. It is seen from FIG. 7 that the most important reactions for $SO_3$ generation are chemical reaction equations (R1), (R3), and (R4) (Refer to (R1), (R3), and (R4) in FIG. 7).

On the other hand, chemical reaction equations (R8) and (R9) written below are competitive chain reactions taking place with chemical reaction equation (R1) of OH generated from $HNO_3$ pyrolysis, and are the chemical reactions to hinder $SO_3$ generation (Refer to (R8) and (R9) in FIG. 7).

NO+OH+M=HONO+M            (R8)

HONO+OH=$H_2O$+$NO_2$            (R9).

Also, the chemical reaction equation (R10) written below is a chain termination reaction inducing radicals not generated, with OH generated from $HNO_3$ pyrolysis reacting to form $H_2O$ and $O_2$, and this reaction, too, acts in the direction of terminating $SO_3$ generation (Refer to (R10) in FIG. 7).

$HO_2$+OH=$H_2O$+$O_2$            (R10).

Figure 8:
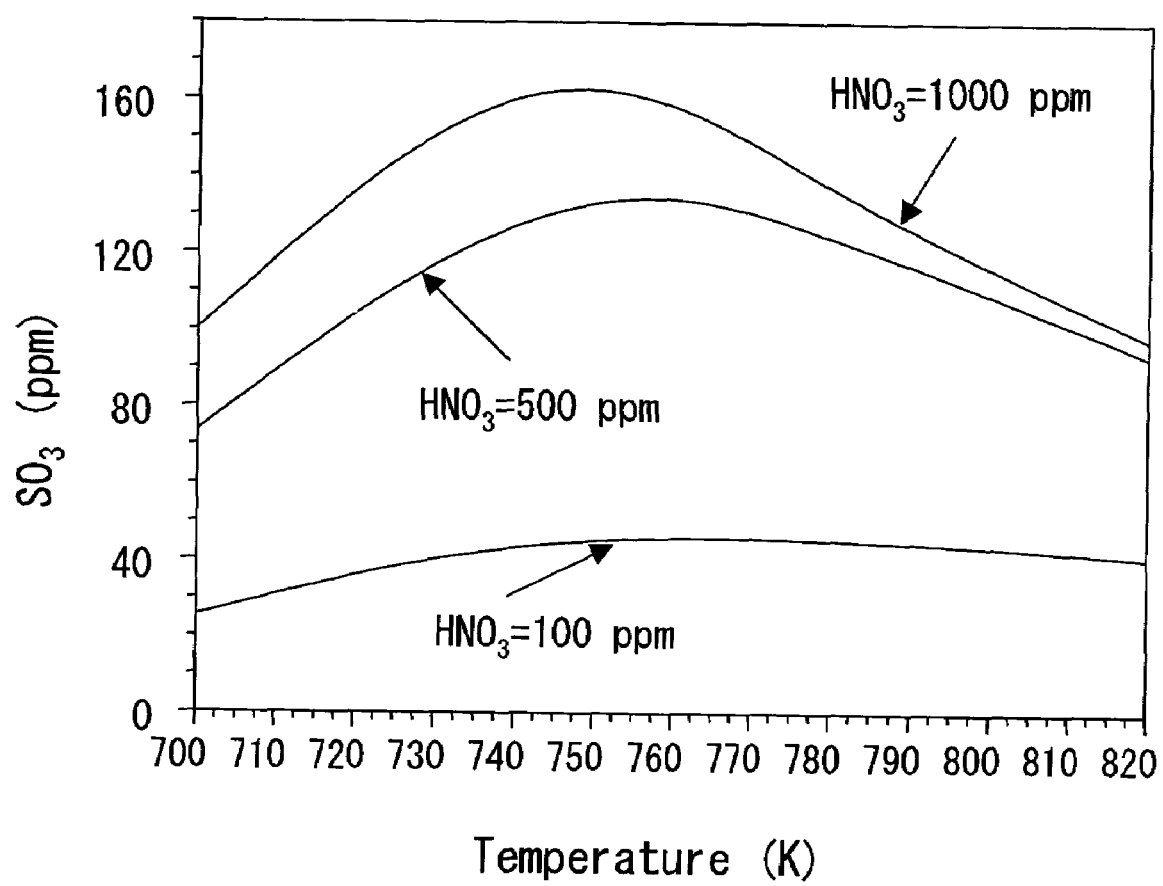
FIG. 8 is a graph showing the calculation result of the temperature dependency of $SO_3$ generation concentration on the amount of added $HNO_3$.

Next is explained for comparison $HNO_3$ addition effect under the condition only with $SO_2$ without NO addition into exhaust gas. FIG. 8 is a graph showing the calculation result of the temperature dependency of $SO_3$ generation concentration on the amount of added $HNO_3$. In the figure, its abscissa is temperature (K), and ordinate is $SO_3$ concentration (ppm). Here, the condition is same as in FIG. 1 except that $SO_2$ concentration in exhaust gas is 2000 ppm, and $HNO_3$ concentration is changed to 100, 500, and 1000 ppm. $SO_3$ conversion increases with $HNO_3$ concentration increase, and reaches 2%, which is maximum, at about T=750K in case of 100 ppm $HNO_3$ addition. Next, $SO_3$ conversion reaches 6.5%, which is maximum, at about T=760K in case of 500 ppm as $HNO_3$ concentration. Further, in case of 1000 ppm as $HNO_3$ concentration, $SO_3$ conversion is seen to reach 8% as maximum at about T=750K.

Thus, $SO_2$ oxidation reaction has low efficiency with $HNO_3$ only without NO addition into exhaust gas. This is assumed as because most of OH generated from $HNO_3$ pyrolysis reacts with $HNO_3$ and $NO_3$, thereby the chain reaction does not function (Refer to chemical reaction equations (R6) and (R7)).

As explained heretofore, the desulfurization and denitration method of $SO_2$ and NO in exhaust gas used in the present invention can oxidize $SO_2$ and NO in exhaust gas containing oxygen simultaneously to $SO_2$ and $NO_2$, by inducing chain reaction with the addition of OH radicals at relatively low temperature of 600-800K. In this case, in order to initiate chain reaction, it is necessary to generate chemical species OH or $HO_2$ as chain carriers. $HNO_3$ is preferable as a radical initiator for said radical generation.

In a typical case that exhaust gas temperature is 750° C, $SO_3$ conversion increases when $HNO_3$ conversion is increased. $NO_2$ conversion shows the tendency to decrease when $HNO_3$ concentration is over 100 ppm, but if $SO_2$ in exhaust gas is about 1000 ppm, almost 20% of $SO_2$ can be converted to $SO_3$ by addition of 1000 ppm of $HNO_3$. In this case, $NO_2$ conversion can be 80 to 90%, about four times as high as $SO_3$ conversion.

Next, the apparatus for simultaneous dry desulfurization and denitration of the present invention using the desulfurization and denitration method described above is explained.

Figure 9:
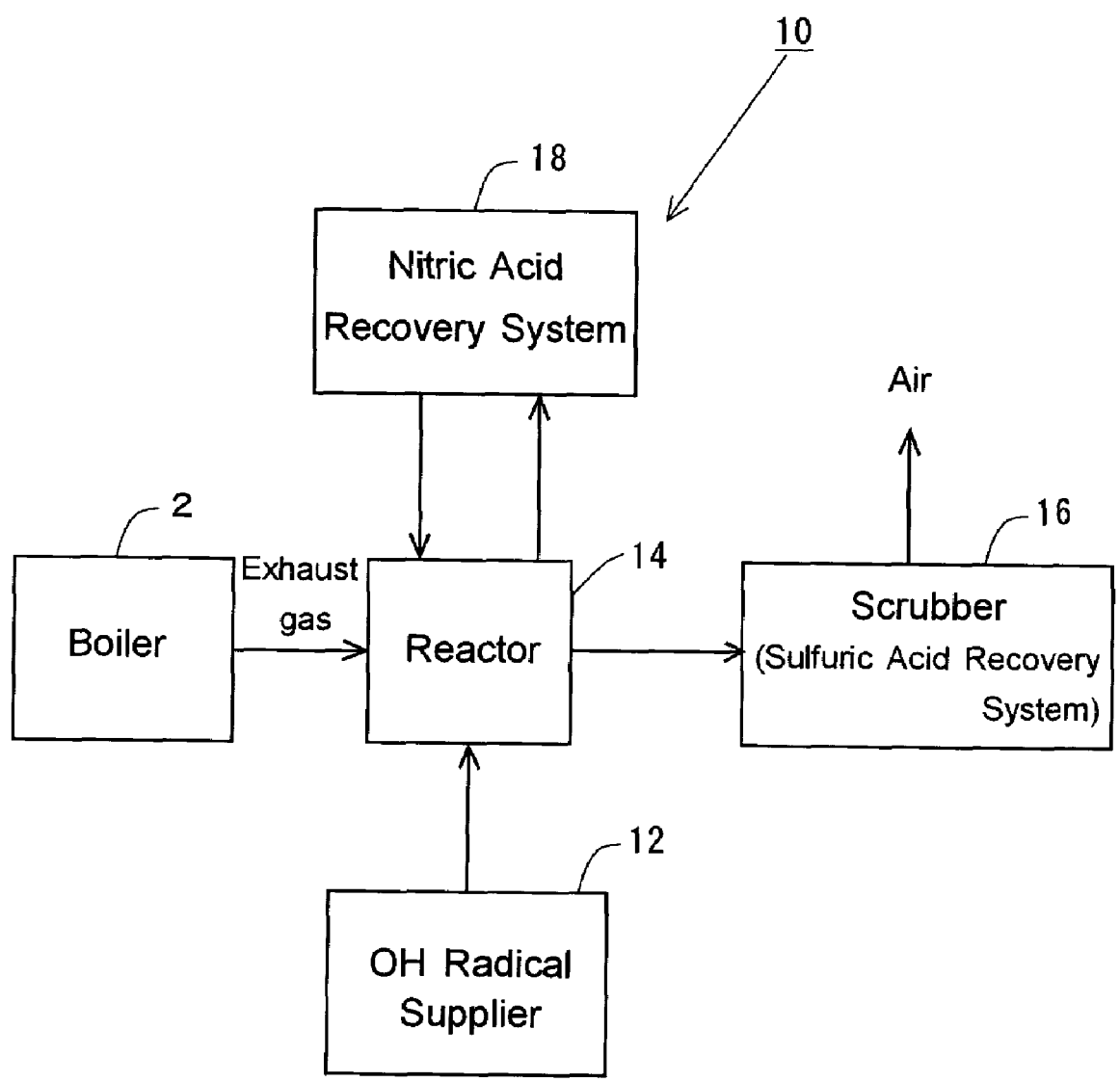
FIG. 9 is a drawing showing the system makeup of an apparatus for simultaneous dry desulfurization and denitration in accordance with the present invention.

FIG. 9 is a drawing showing the system structure of a dry process apparatus for simultaneous desulfurization and denitration in accordance with the present invention. Referring to FIG. 9, an apparatus for simultaneous dry desulfurization and denitration 10 in accordance with an embodiment of the present invention is comprised of an OH radical supplier 12, a reactor 14, a sulfuric acid recovery system 16, and a nitric acid recovery system 18, and the exhaust gas from a boiler 2 or others is introduced into the reactor 14. The apparatus for simultaneous dry desulfurization and denitration 10 in accordance with the present invention may be provided to a flue gas duct as a path of exhaust gas from various combustion apparatuses.

Figure 10:
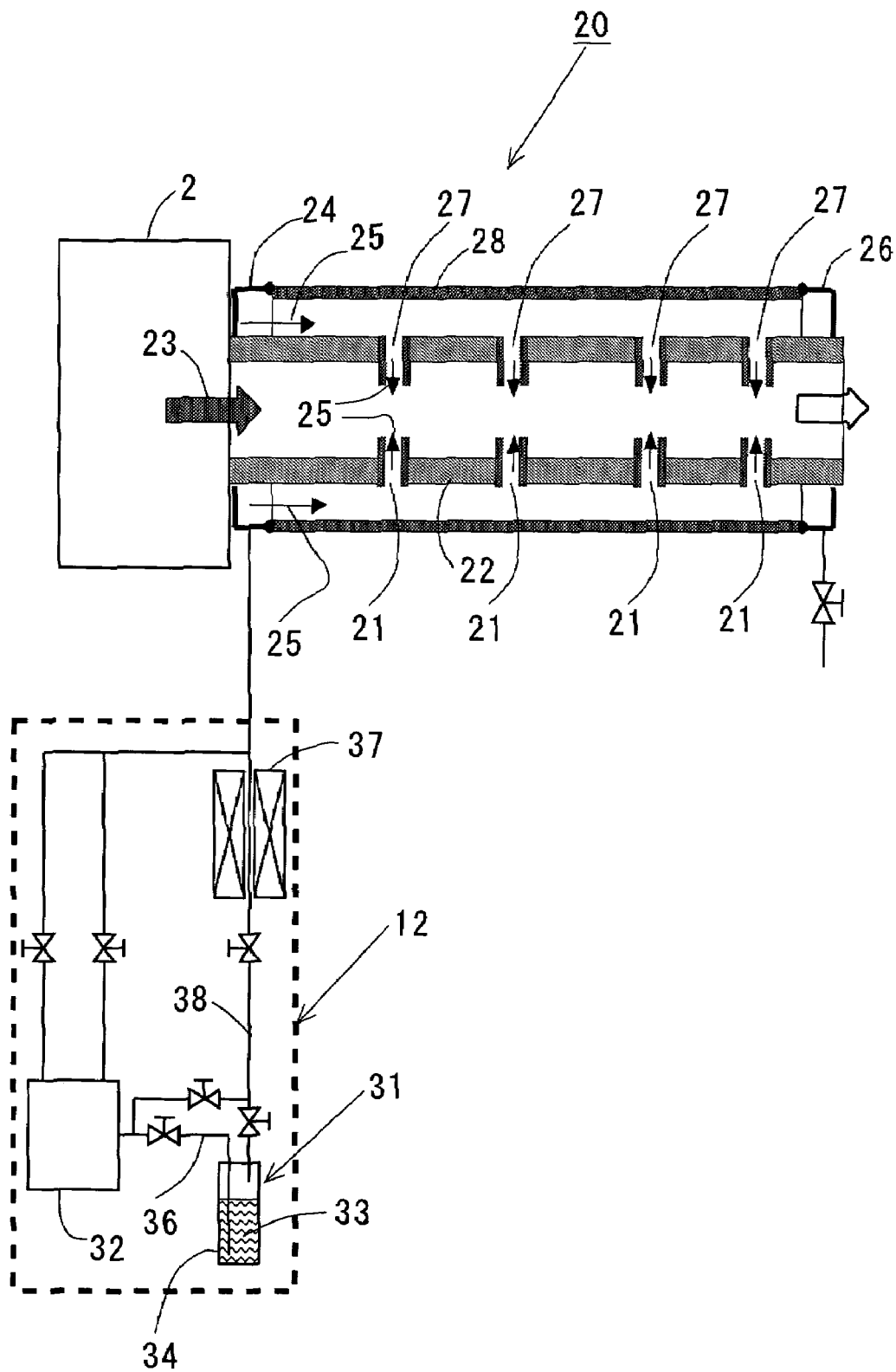
FIG. 10 is a partial outline of a cross sectional view of a reactor and an OH radical supplier in accordance with a suitable embodiment.

FIG. 10 is an outline of a reactor and an OH radical supplier in accordance with a suitable embodiment. Referring to FIG. 10, a reactor 20 is comprised of an inner tube 22 to introduce exhaust gas 23 at 600-800° C. from the boiler 2, and an outer tube 28 which is provided with said inner tube coaxially inside, and forming a closed space together with manifolds 24 and 26 at both ends. Said inner tube is provided at preferable positions with radical supplying inlets 21 and 27 in the direction of exhaust gas introduction, that is, at symmetrical positions with respect to coaxial direction. As shown in FIG. 10, exhaust gas 23 is supplied from one end of the inner tube 22, $SO_2$ and NO contained in said exhaust gas 23 are simultaneously oxidized, and are exhausted from the other end.

The space between the inner tube 22 and the outer tube 28 is an introducing line of OH radicals or OH radical initiators. The inner tube 22 is provided with radical supplying inlets 21 and 27 at four steps, but it may be at one step depending on the scale of exhaust gas treating, or may be appropriately at many steps. Here, the arrow 25 in FIG. 10 shows the flow of OH radicals or OH initiators.

Here, multi-step reaction may be designed to proceed by further separating the inner tube 22 with partition walls for each radical supplying inlet 21 and 27, and blowing in OH radicals or OH radical initiators at multi-steps in the direction from exhaust gas 23 introducing side to exhaust side. Since thereby $SO_2$ and NO are treated at each step, the conversions of $SO_3$ and $NO_2$ can be made almost 100%.

As is shown in FIG. 10, the OH radical supplier 12 is provided with a gas supplier 32 for $N_2$, $O_2$, and NO, and with an OH radical initiating source 31. And the gas supplier 32 is provided with by mass flow meters and valves not shown in the figure and is controlled by the computer to supply gases according to the pre-set flow rates and reaction processes.

Here, in order to oxidize $SO_2$ in exhaust gas efficiently to $SO_3$, it is important to properly adjust NO concentration. Therefore, it is preferable to have NO controllable to 0 to about 200 ppm in said gas supplying system.

The OH radical supplier 12 is provided with a tank 34 filled with an OH radical initiator 33, $HNO_3$ here, a carrier gas supply line 36 to carry said $HNO_3$ 33 as vapor, and an OH radical initiator supply line 38. $HNO_3$ may be either 100% or aqueous solution of pre-designed ratio.

Here, exhaust gas is 600-800° C., and in such temperature region, $HNO_3$ as a radical initiator is pyrolyzed to generate OH radicals, but for the case that the temperature of exhaust gas is low or the like, an electric furnace 37 may be provided before inlet into the manifold 24, thereby radical initiators are surely pyrolyzed to supply OH radicals. The tank 34 is also preferably temperature controllable, though depending on its scale.

The function of the apparatus for simultaneous dry desulfurization and denitration in accordance with a suitable embodiment of the present invention is explained next. Referring to FIG. 10, 100% $HNO_3$ is held at the pre-designed temperature, its vapor pressure is controlled based on a pressure sensor not shown here, $N_2$ is bubbled from the gas supplying system 32, and $HNO_3$ vapor is introduced with carrier gas from the tank 34 through the manifold 24. When the exhaust gas 23 of 600-800° C. is introduced, $SO_2$ and NO in the exhaust gas 23 are simultaneously oxidized with OH radicals as an initiator generated by pyrolysis of $HNO_3$, $SO_3$ and $NO_2$ are formed, and exhausted from the reactor 20. Here, if $SO_2$ concentration in exhaust gas is, for example, 1000 ppm, $HNO_3$ is also introduced at the similar concentration of 1000 ppm. Thus, in the present embodiment, simultaneous desulfurization and denitration can be realized only by supplying OH radicals or OH radical initiators into the exhaust gas of high temperature.

Figure 11:
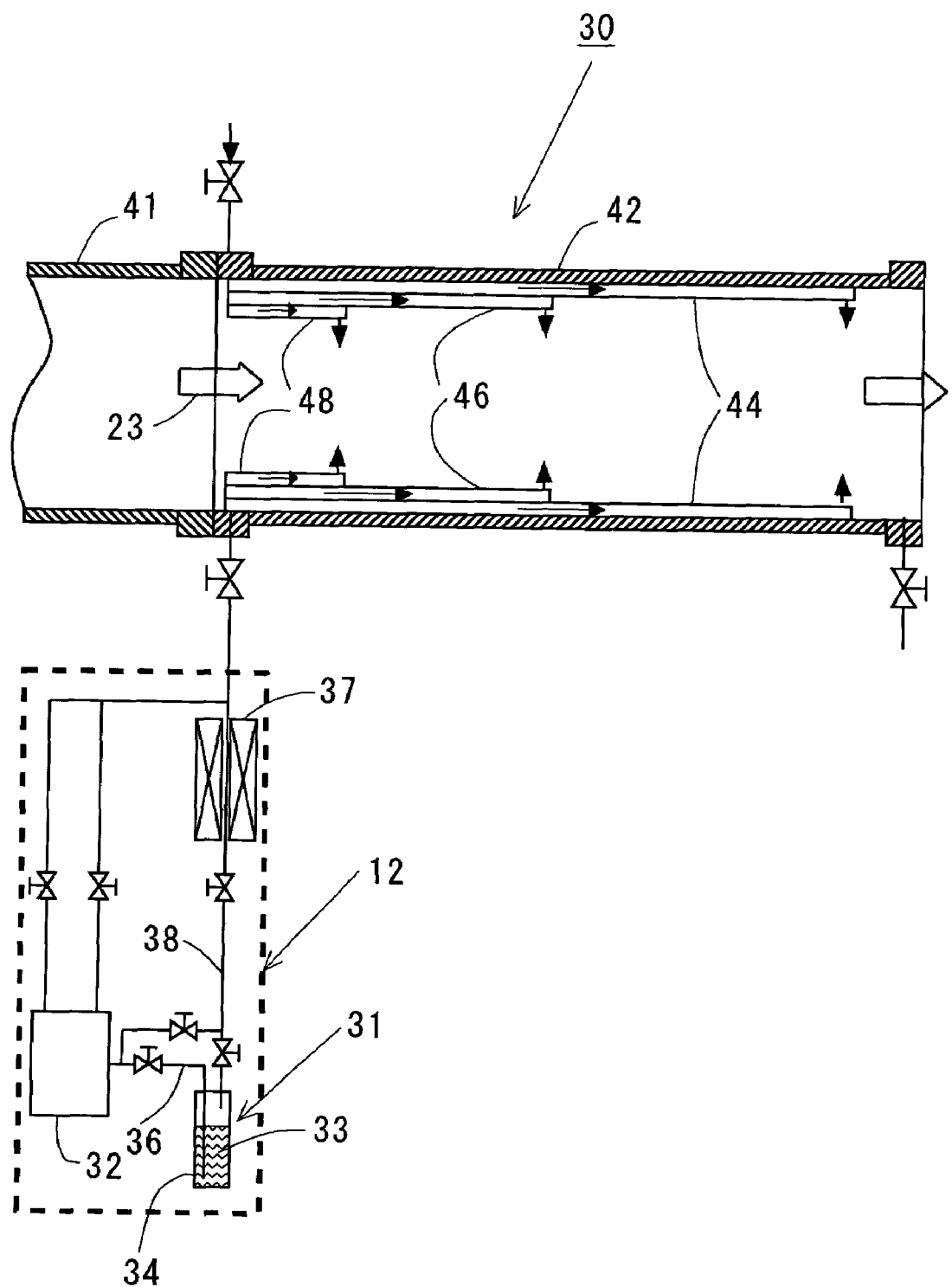
FIG. 11 is a partial outline of a cross sectional view of a reactor and an OH radical supplier in accordance with another suitable embodiment.

FIG. 11 is a reactor in accordance with another embodiment. Referring to FIG. 11, a reactor 30 is comprised of an outer tube 42 set coaxially and closely with an exhaust gas introducing line 41, and injectors 44, 46, and 48 set at proper length and position, and said injectors 44, 46, and 48 are supplied with OH radicals or an OH radical initiators from the OH radical supplier 12.

Figure 12:
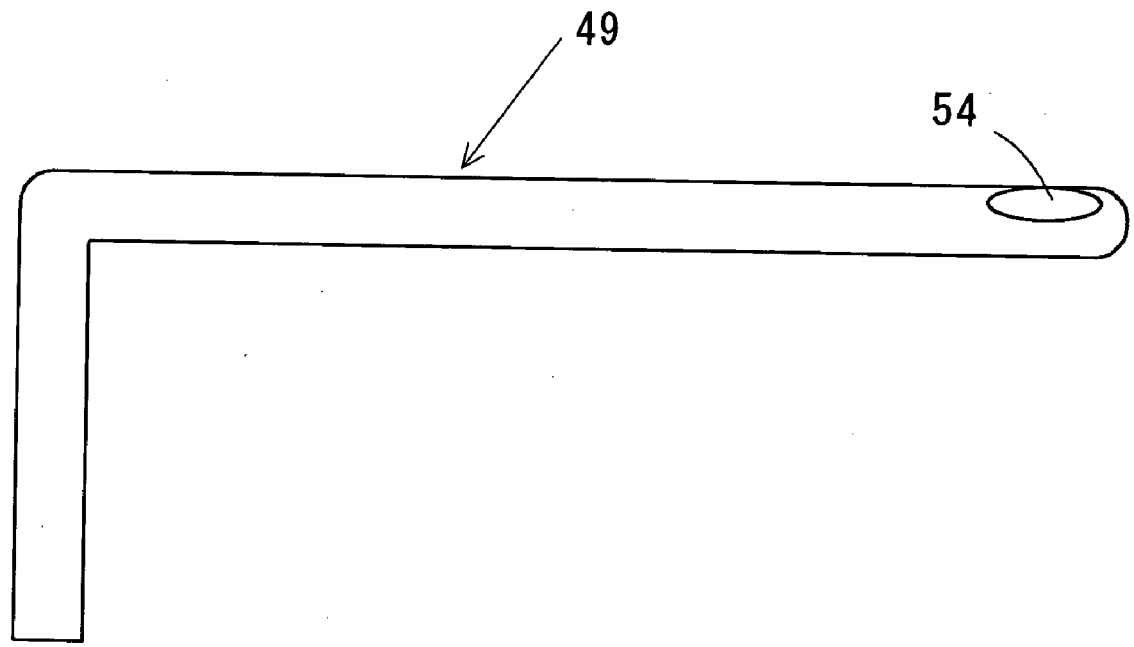
FIG. 12 is an external view showing an example of an injector.
Figure 12:
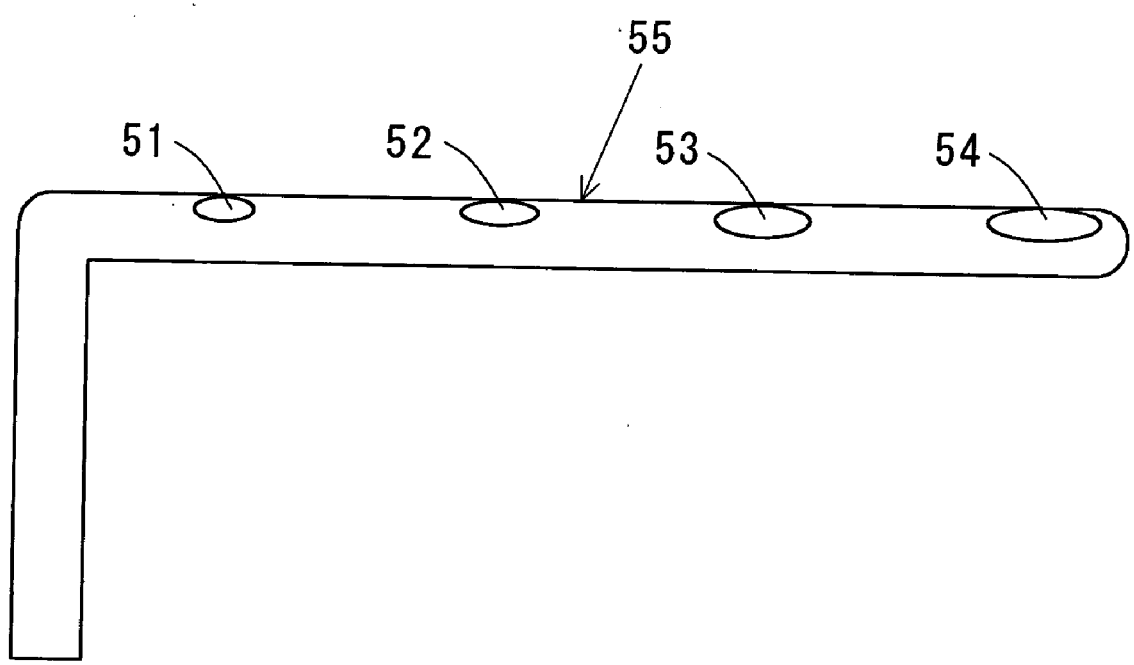

FIG. 12 is an external view showing an example of an injector. The injector 49 shown in FIG. 12(a) is provided with a single blowout hole 54 at a tip side, and an injector 55 shown in FIG. 12(b) is provided with blowout holes 51, 52, 53, and 54 at proper positions, and the sizes of blowout holes are appropriately varied with the conductances of injectors taken into consideration. Here, in the example shown in FIG. 12, the blowout holes are set at one side of the injector, but they may be set at both sides. Such the injector is set at the center of the reactor, and supplies OH radicals or OH radical initiators.

In order to desulfurize and denitrate efficiently, it is necessary to determine the optimum length of the injector, and it has to be preferably determined depending upon the scale of the apparatus. Also, injectors may be pipes of stainless steel or quartz, but stainless steel is preferred, because of higher decrease ratio of NO and $SO_2$. In case to introduce OH radicals or an OH radical initiators with injectors, it is easy to adjust the positions of blowout holes of injectors in a reactor and the supply quantity so that efficient desulfurization and denitration are possible depending upon the scale of exhaust gas and exhaust gas treating apparatus.

The OH radical supplier 12 shown in FIG. 11 is to supply $HNO_3$ vapor or $HNO_3$ vapor and steam, but it may be an OH radical supplier to supply $HNO_3$ droplets. In this case, the injector is changed to spray nozzle, which introduces $HNO_3$ droplets into the reactor.

Figure 13:
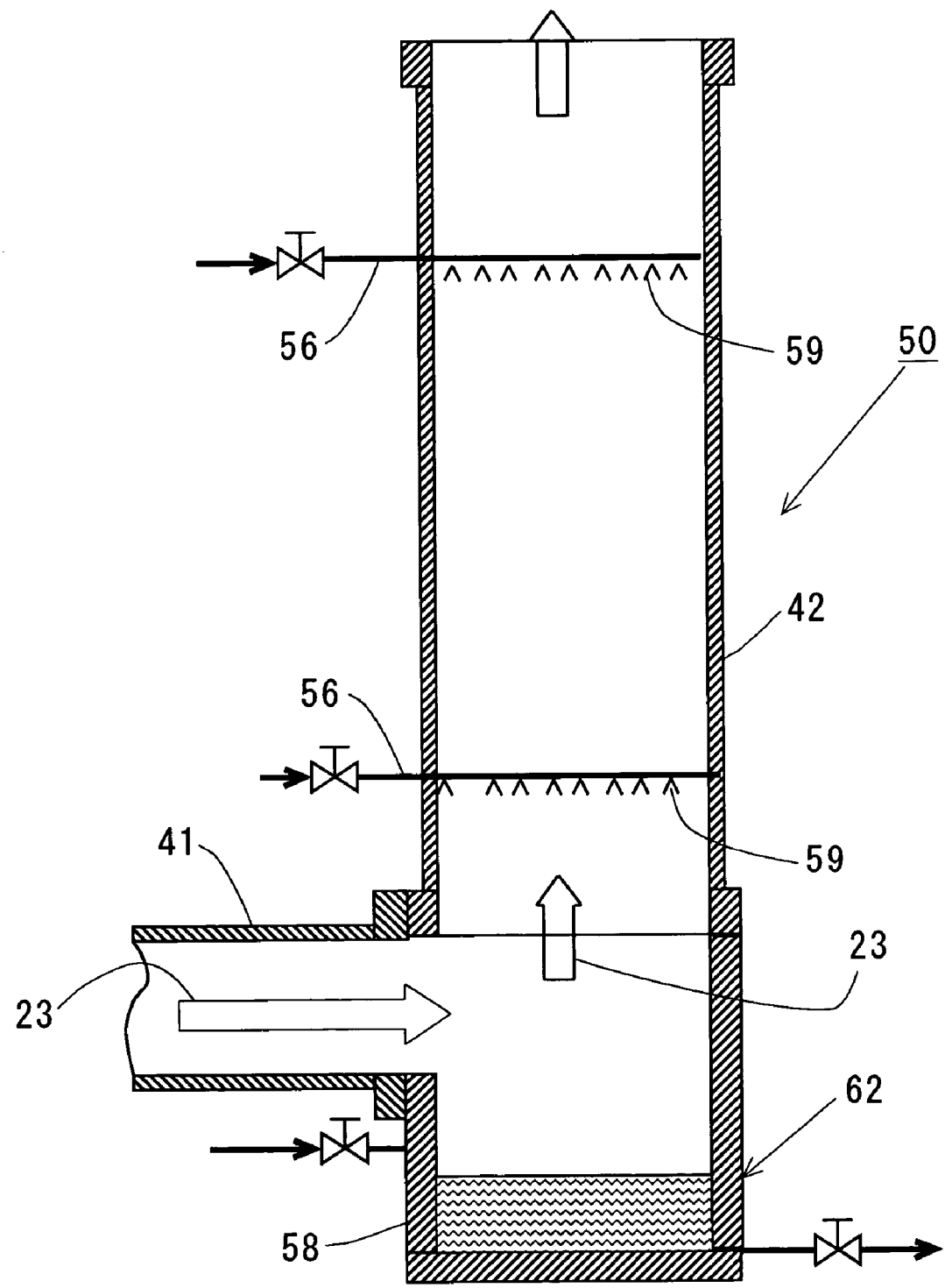
FIG. 13 is a cross sectional view showing an outline of a reactor provided with a shower pipe.
Figure 14:
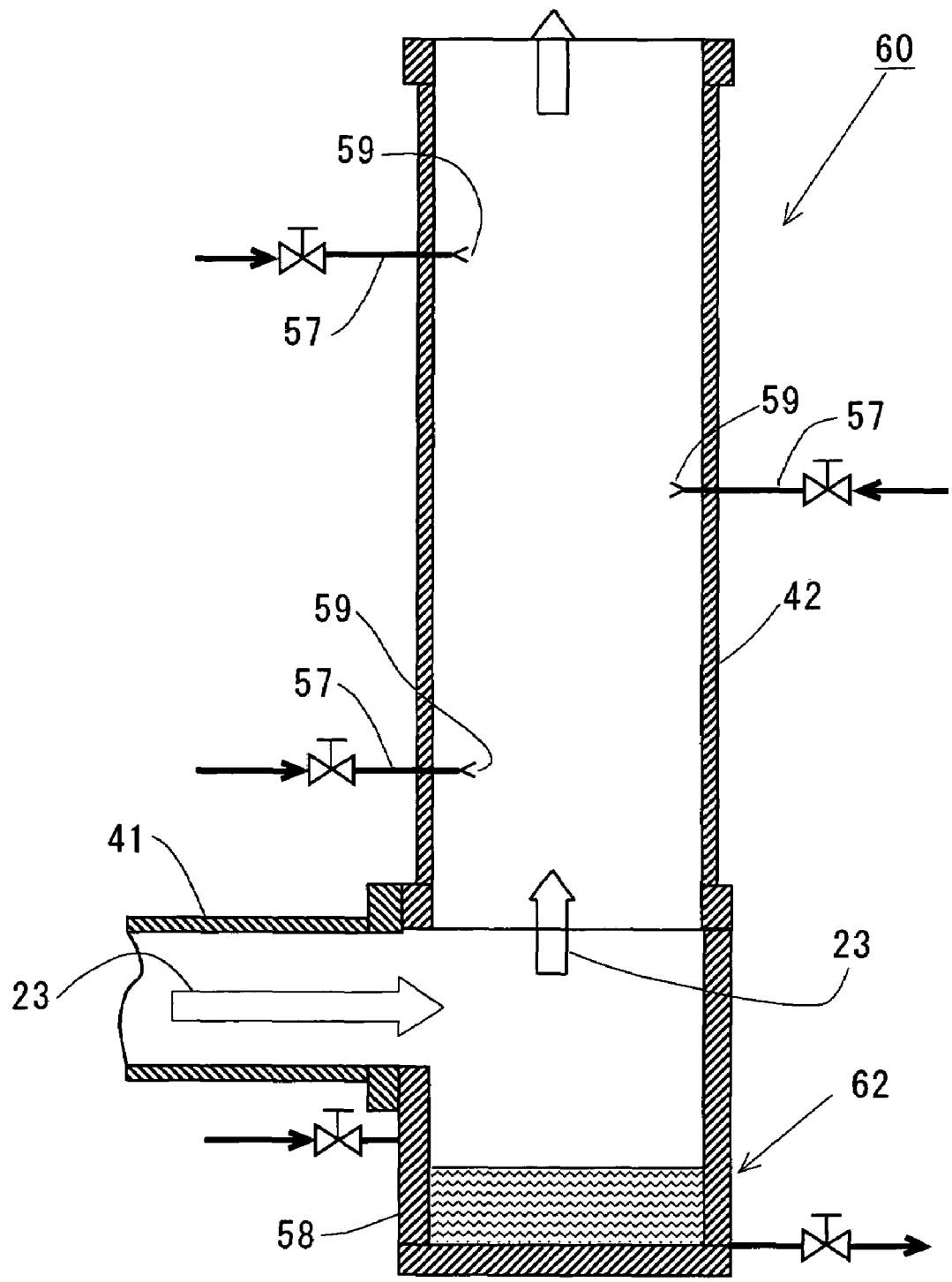
FIG. 14 is a cross sectional view showing an outline of a vertical reactor provided with a spray nozzle.

FIG. 13 is an outline of a reactor in which $HNO_3$ droplets are sprayed. Referring to FIG. 13, the reactor 50 has an outer tube 42 set in the direction vertical to the exhaust gas introducing line 41, a $HNO_3$ recovery apparatus 62 is provided at the exhaust gas introducing inlet side of said outer tube 42, and a recycling bath 58 of $HNO_3$ as an OH radical initiator is provided. Further, shower pipes 56 and 56 are provided at appropriate positions of the outer tube 42 of the reactor 50, and from said shower pipes 56 and 56, an OH radical initiator is supplied by spraying. Here, 59 in FIG. 13 illustrates the mist of OH radical initiators. When said supplied $HNO_3$ as an OH radical initiator is cooled and accumulated in a recycling bath 58, the OH radical initiator accumulated here is recycled to shower pipes 56 and 56 with a pump not shown here. In a reactor 60 shown in FIG. 14, an OH radical initiator is supplied with a spray nozzle 57 instead of the shower pipe 56 shown in FIG. 13, and 59 in FIG. 14 illustrates the mist of OH radical initiators.

Figure 15:
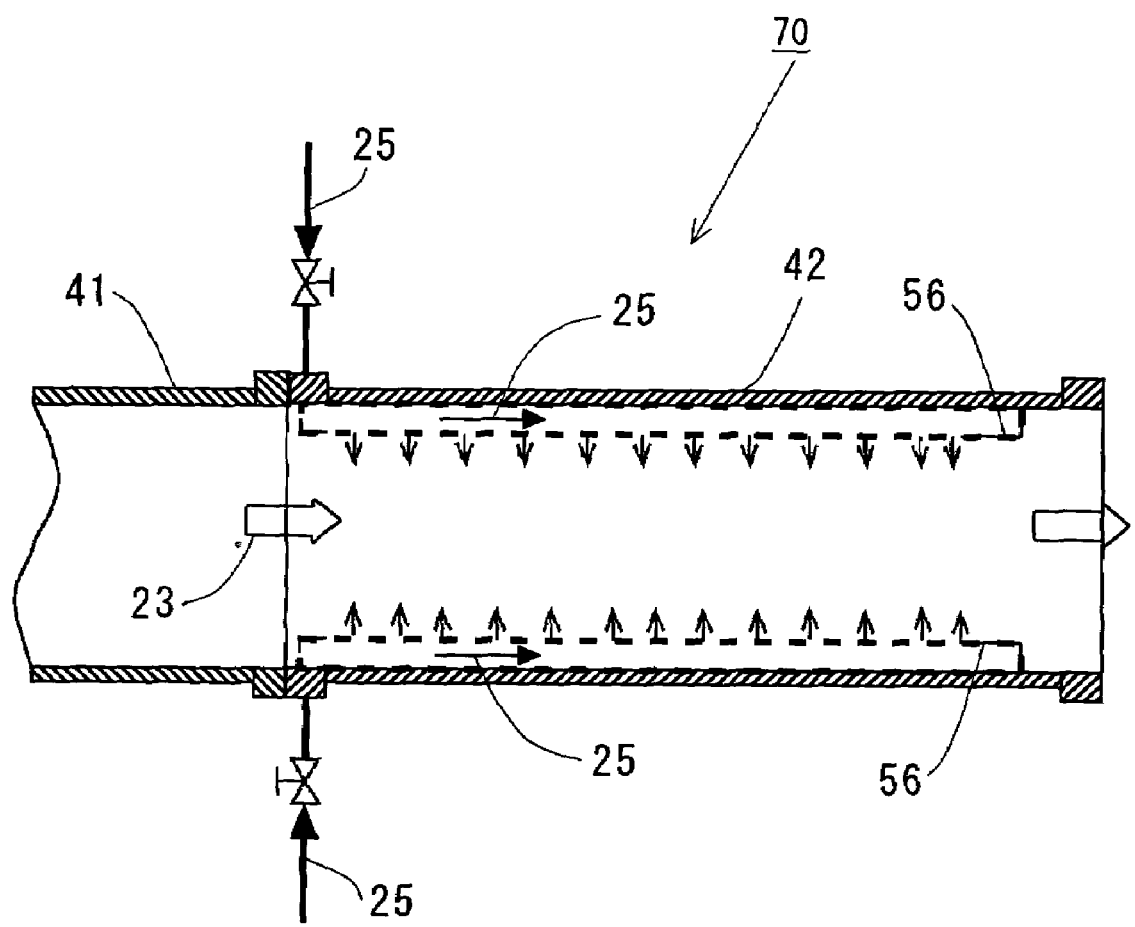
FIG. 15 is a cross sectional view showing an outline of a horizontal reactor provided with a shower pipe.

FIG. 15 is of a horizontal type reactor 70, and shower pipes 56 and 56 are provided along an outer tube wall. The reactor described above may be either vertical or horizontal type.

When the exhaust gas of 600-800° C. is introduced into such a reactor, OH radicals supplied from the OH radical supplier or the OH radical generated from pyrolysis of an OH radical initiator acts as an initiator of the above-mentioned chain reaction to simultaneously oxidize $SO_2$ and NO in exhaust gas, and $SO_3$ and $NO_2$ are exhausted.

Next, a recovery apparatus of sulfuric acid and $HNO_3$ is explained.

Figure 16:
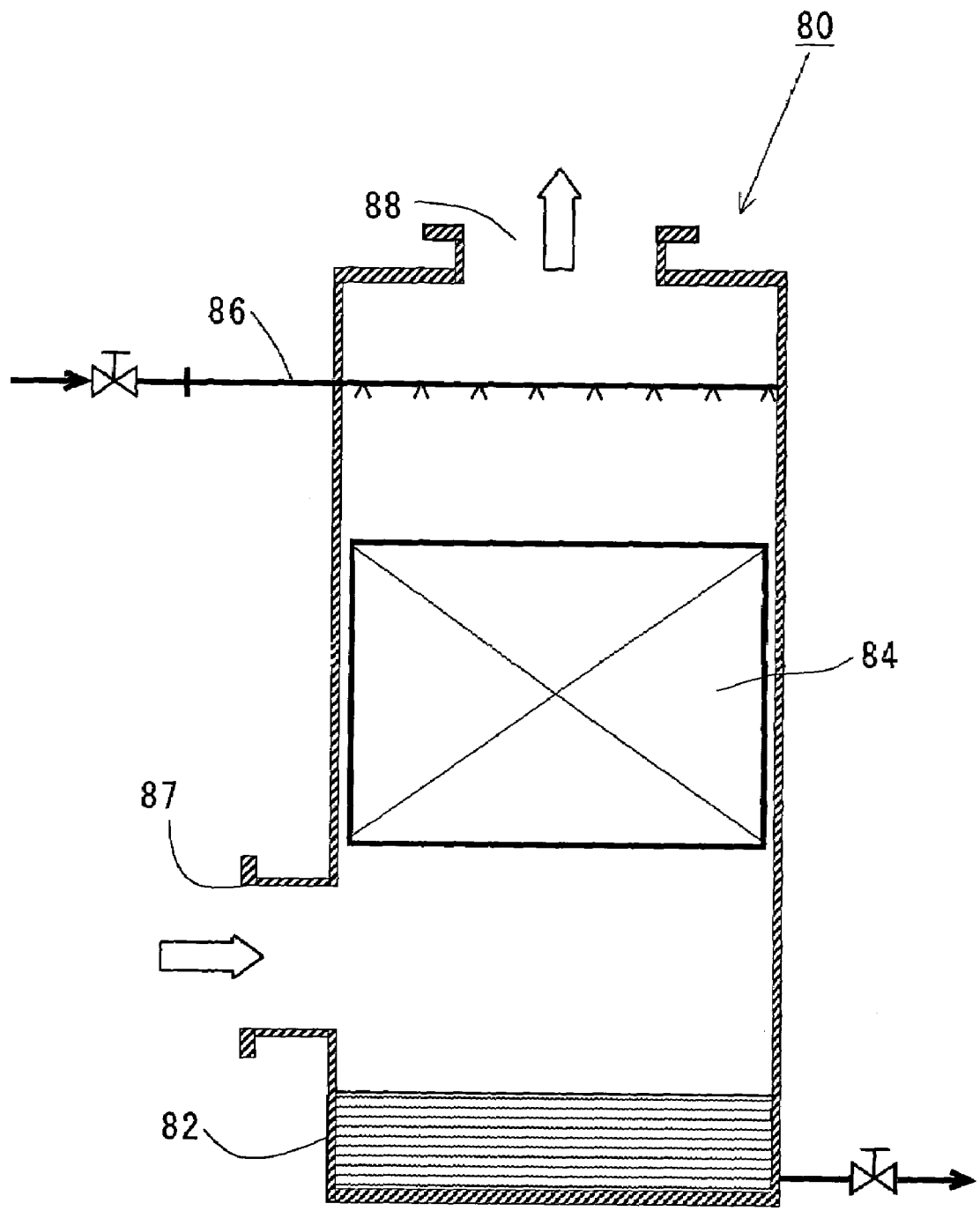
FIG. 16 is a cross sectional view showing an outline of a scrubber.

FIG. 16 shows an example of a sulfuric acid recovery apparatus. The sulfuric acid recovery apparatus is a scrubber 80, provided with a bath 82, a packed tub 84, and a shower pipe 86 to spray absorbent, and the cooled exhaust gas containing $SO_3$ gas is introduced from a gas inlet 87, and exhausted from a gas outlet 88. The absorbent is water in small quantity, and water and $SO_3$ gas contact in the packed tube 84 to form sulfuric acid to be stored and recovered in the bath 82. Thus, $SO_3$ can be recovered as sulfuric acid by scrubber with water as the absorbent. Since $SO_3$ can be easily converted to sulfuric acid even under extremely trace amount of water, it is useful as a byproduct. Also, sulfuric acid may be recovered as gypsum with calcium carbonate added and reacted with it.

The sprayed $HNO_3$ is recovered by the above-mentioned $HNO_3$ recovery apparatus. Or, after $SO_3$ is recovered by an electric dust collector, $NO_2$ may be absorbed by a scrubber to be recovered as $HNO_3$, supplied to the above-mentioned $HNO_3$ recovery apparatus and reused.

The present invention is by no way limited to the above-mentioned embodiments, but various modification is possible within the range of the invention described in Claims, and needless to say that it is also included in the present invention. For example, the reactor to blow in OH and OH radicals at multi-steps as explained in the above-mentioned embodiments may of course be properly designed, manufactured, and applied so as to be attached to various combustion apparatuses depending upon the flow rate of exhaust gas and $SO_2$ and NO gas concentrations to be desulfurized and denitrated.

INDUSTRIAL APPLICABILITY

As is explained above, since said apparatus for simultaneous dry desulfurization and denitration is such that the supplied OH radicals act as initiators to induce chain reaction, simultaneously oxidize $SO_2$ and NO in exhaust gas, and exhaust them as $SO_3$ and $NO_2$, it can treat exhaust gas by dry method without using catalyst or others, as well as has the effect of high efficiency and low cost.

Also, the apparatus for simultaneous dry desulfurization and denitration provided with either or both of a sulfuric acid or $HNO_3$ recovery apparatuses has the effect capable of recovery of oxidized $SO_3$ and $NO_2$ as sulfuric acid and $HNO_3$, and further an OH radical initiator as $HNO_3$, in case that $HNO_3$ is used as the OH radical initiator.

What is claimed is:

1. A method for simultaneous dry desulfurization and denitration using an apparatus which comprises: a reactor into which an exhaust gas of high temperature is introduced; and a supplier to introduce nitric acid into said reactor, characterized in that, OH radicals are generated by said nitric acid being introduced into said exhaust gas of high temperature and pyrolyzed, and chain reactions are constituted by said OH radicals, and both of the sulfur dioxide ($SO_2$) and the nitrogen monoxide (NO) in exhaust gas are simultaneously oxidized for exhaust gas treatment.

2. The method for simultaneous dry desulfurization and denitration as set forth in claim 1, characterized in that gas which does not directly contribute to reactions is added into said exhaust gas.

3. The method for simultaneous dry desulfurization and denitration as set forth in claim 2, characterized in that the chain reaction in which said OH radicals are added into the exhaust gas is constituted as, $$OH + SO_2 + M = HOSO_2 + M \quad (R1),$$

$$OHSO_2O_2 = HO_2 + SO_3 \quad (R2), \text{ and}$$

$$HO_2 + NO = OH + NO_2 \quad (R3).$$

4. The method for simultaneous dry desulfurization and denitration as set forth in claim 1, characterized in that said reaction is conducted under the atmospheric pressure.

5. The method for simultaneous dry desulfurization and denitration as set forth in claim 1, characterized in that said reaction is conducted at a temperature of 650K to 800K.

6. The method for simultaneous dry desulfurization and denitration as set forth in claim 1, characterized in that said reaction is conducted at a temperature of about 600 to 800° C.

* * * * *